C. H. PALMER, Jr.
Whiffletree-Iron.

No. 210,554.  Patented Dec. 3, 1878.

Witnesses.
L. T. Connor.
N. E. Whitney

Inventor.
Charles H. Palmer Jr.
by Crosby Gregory Attys

UNITED STATES PATENT OFFICE.

CHARLES H. PALMER, JR., OF MERRIMAC, MASSACHUSETTS.

IMPROVEMENT IN WHIFFLETREE-IRONS.

Specification forming part of Letters Patent No. 210,554, dated December 3, 1878; application filed November 1, 1878.

*To all whom it may concern:*

Be it known that I, CHARLES H. PALMER, Jr., of Merrimac, county of Essex, State of Massachusetts, have invented an Improvement in Whiffletree-Irons, of which the following description, in connection with the accompanying drawings, is a specification.

This invention relates to devices chiefly applicable to hold a whiffletree-bar upon its cross-bar, either of shafts or poles; but the devices, made of proper size, may be used as the connecting means between other portions of carriages or things one of which is to oscillate upon another.

The object of my invention is to form a practically noiseless, water-tight, and firm connection between the whiffletree and its cross-bar; and my invention consists in a flanged plate or washer adapted to receive within it an annular disk, about which the flanged plate oscillates, the disk and plate being held together by a bolt, the head and nut of which are concealed.

Figure 1:
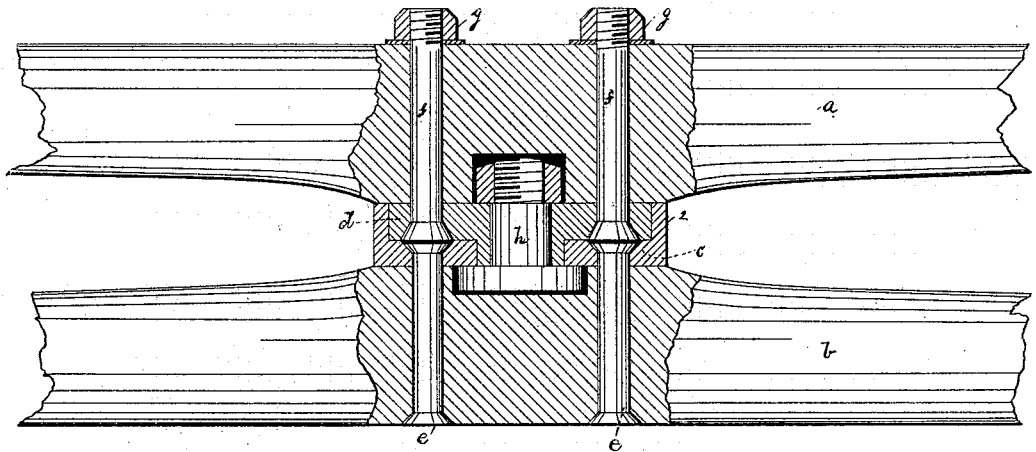
Figure 2:
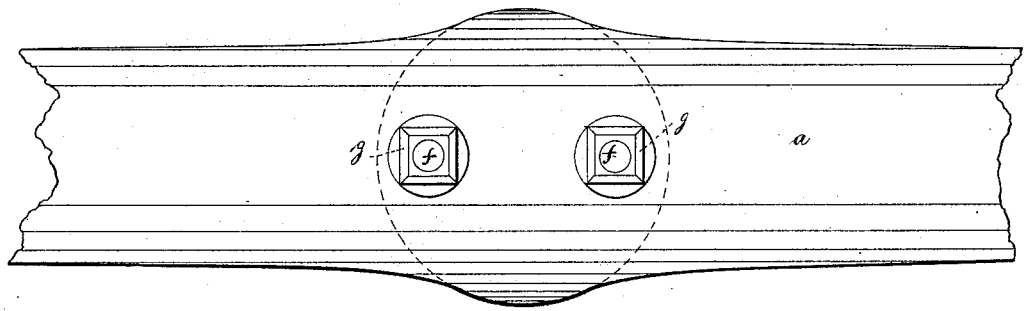

Figure 1 represents an inverted partially-sectional view of a piece of a whiffletree-bar and a cross-bar, held together by my improved devices, and Fig. 2 is a top view of Fig. 1.

In the drawing, $a$ denotes part of a cross-bar, and $b$ part of a whiffletree-bar, of a carriage. The connecting devices are shown as composed of a plate, $c$, having about it an annular flange, 2, preferably of a sufficient depth to receive within it a disk, $d$, and extend beyond the outer face of the disk, so as to bear against the wood-work of the cross-bar, as shown in Fig. 1. This annular plate is attached to the whiffletree by two rivets or bolts, $e\ e$, extended through both. The disk $d$ is secured to the cross-bar by means of bolts $f\ f$, provided with nuts $g$, to permit the whiffletree to be detached.

The plate and disk are held together by a bolt, $h$, the head and nut of which are let into recesses in the whiffletree and cross-bar, and are always retained out of sight, and the connection is such that the nut can never become detached from the bolt $h$.

When putting the parts together, the bolt $h$ is first passed through the opening at the center of the plate $c$, the plate is placed against the under side of the whiffletree, with the head of bolt $h$ in a recess therein, and the rivets $e\ e$ are inserted. The bolts $f\ f$ are then inserted through proper holes in the disk, the disk has its central hub placed down over the bolt $h$ and into the opening at the center of the plate, and the nut is applied to the bolt $h$ and turned to make the joint as close as desired. Then the bolts $f$, projecting from the disk $d$ and the whiffletree, are inserted through holes in the cross-bar $a$, the nut of bolt $h$ is received in a recess in the cross-bar, and the nuts $g\ g$ are applied.

The flange 2, meeting and fitting against the cross-bar closely, as shown in Fig. 1, excludes water and dust.

Preferably, the flanged portion of the plate will be painted the same as the whiffletree, thereby practically concealing the iron-work at the point where the whiffletree turns.

A packing may be used between the flange 2 and cross-bar.

I claim—

1. The bars $a\ b$, combined with the plate provided with a circular flange, the disk within it, and the connecting-bolt $h$, the head and nut of which are concealed in recesses in the said bars, substantially as described.

2. A whiffletree and cross-bar connecting device composed of a disk adapted to be attached to the cross-bar, a plate provided with a circular flange adapted to be connected with the whiffletree, to surround or inclose the disk and form a water-tight joint at the cross-bar, and a central bolt, $h$, the said disk and plate being provided with openings for the reception of bolts and rivets, substantially as shown and described.

In testimony whereof I have signed my name to this specification in the presence of two subscribing witnesses.

CHAS. HENRY PALMER, JR.

Witnesses:
GEORGE A. PERRY,
ALBERT PARKER.